(12) United States Patent
Carlson et al.

(10) Patent No.: US 6,842,898 B1
(45) Date of Patent: Jan. 11, 2005

(54) METHOD AND APPARATUS FOR MONITORING AND HANDLING EVENTS FOR A COLLECTION OF RELATED THREADS IN A DATA PROCESSING SYSTEM

(75) Inventors: Michael Pierre Carlson, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,456

(22) Filed: Jun. 10, 1999

(51) Int. Cl.[7] .............................................. G06F 9/46
(52) U.S. Cl. ...................................................... 718/100
(58) Field of Search ............................... 718/100–108; 709/100–108, 229, 230

(56) References Cited

U.S. PATENT DOCUMENTS

| | | | | |
|---|---|---|---|---|
| 5,305,455 A | * | 4/1994 | Anschuetz et al. | 709/100 |
| 5,471,576 A | * | 11/1995 | Yee | 715/500.1 |
| 5,542,088 A | * | 7/1996 | Jennings et al. | 709/103 |
| 5,640,529 A | * | 6/1997 | Hasbun | 711/103 |
| 5,745,703 A | * | 4/1998 | Cejtin et al. | 709/238 |
| 5,835,763 A | * | 11/1998 | Klein | 709/101 |
| 5,881,277 A | * | 3/1999 | Bondi et al. | 712/239 |
| 6,161,147 A | * | 12/2000 | Snyder et al. | 719/310 |
| 6,167,455 A | * | 12/2000 | Friedman et al. | 719/320 |
| 6,182,142 B1 | * | 1/2001 | Win et al. | 709/229 |
| 6,233,599 B1 | * | 5/2001 | Nation et al. | 709/102 |
| 6,247,039 B1 | * | 6/2001 | Callsen | 709/101 |
| 6,314,446 B1 | * | 11/2001 | Stiles | 709/100 |
| 6,418,542 B1 | * | 7/2002 | Yeager | 714/38 |
| 6,639,687 B1 | * | 10/2003 | Neilsen | 358/1.14 |

OTHER PUBLICATIONS

Fleischeuers, Marc, "Distributed Garbage Collection in CORBA", Newgroups: comp.object.corba, Jul. 7, 1998.*

* cited by examiner

*Primary Examiner*—Meng-Al T. An
*Assistant Examiner*—Kenneth Tang
(74) *Attorney, Agent, or Firm*—Duke W. Yee; David A. Mims, Jr.; Cathrine K. Kinslow

(57) ABSTRACT

The present invention provides a method in a data processing system for monitoring a plurality of related threads. The plurality of related threads is polled for status information. Responsive to receiving the status information, A determination is made as to whether a thread within a plurality of related threads is active. Responsive to an absence of a determination that a thread within the plurality of related threads is active, a cleanup processes is initiated for the thread based on the status information.

27 Claims, 7 Drawing Sheets

METHOD AND APPARATUS FOR MONITORING AND HANDLING EVENTS FOR A COLLECTION OF RELATED THREADS IN A DATA PROCESSING SYSTEM

BACKGROUND OF THE INVENTION

1. Technical Field

The present invention relates to an improved data processing system and in particular to a method and apparatus for multitasking in a data processing system. Still more particularly, the present invention relates to a method and apparatus for monitoring and handling events for a plurality of related threads in a data processing system.

2. Description of Related Art

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

JavaOS for Business is an Java operating system which allows java bytecode to execute in Java applications. Unlike typical client-server architectures, JavaOS for Business is network managed client to lower the cost of ownership and allow scaleable from high memory, fat clients computers to low memory, hand held devices or thin clients. JavaOS for Business is the first operating system largely implemented using Java. Platform hardware specific functions still use some native compiled code, but a large percentage (approximately 80–95%) of operating system tasks that are implemented in Java byte interpreted code. JavaOS for Business has the only operating system print subsystem implemented entirely in Java code. As a result the print subsystem can interact with lower level, platform specific subsystems such as the sending data to the network card or local ports, but is abstracted from low-level interaction (setup, initialization of devices, soft or hard data errors, write/read retries, etc.).

One problem with the print subsystem in JavaOS for Business is that a print subsystem is unable to obtain information about events, which affect printing because other parts of the operating system do not implement Operating System Events (OSEvent). Some subsystems use OSEvents to communicate state changes such as power management, server managed runtime system database data, devices such as audio volume, logon messages during booting, etc. OSEvent producers, consumers, enumerators and buffers are used to implement this operating system messaging. In addition to this problem, many subsystems do not implement OSEvents to communicate state changes, the print subsystem needs to remain implemented in platform-independent java code, unaware of the network, processor or system board printer attachment (parallel, serial, USB, etc).

Thus, it would be advantageous to have an improved method and apparatus for monitoring and handling events for a print subsystem.

SUMMARY OF THE INVENTION

A method in a data processing system for monitoring a plurality of related threads. The plurality of related threads is polled for status information. Responsive to receiving the status information, a determination is made as to whether a thread within a plurality of related threads is active. Responsive to an absence of a determination that a thread within the plurality of related threads is active, a cleanup processes is initiated for the thread based on the status information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
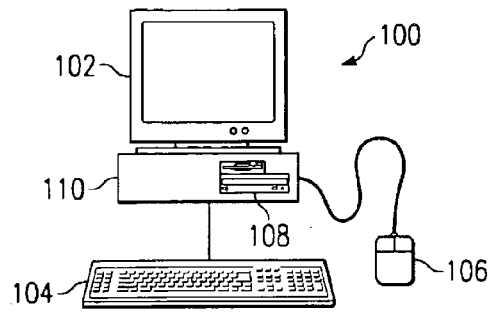
FIG. 1 is a pictorial representation depicting a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

Figure 2:
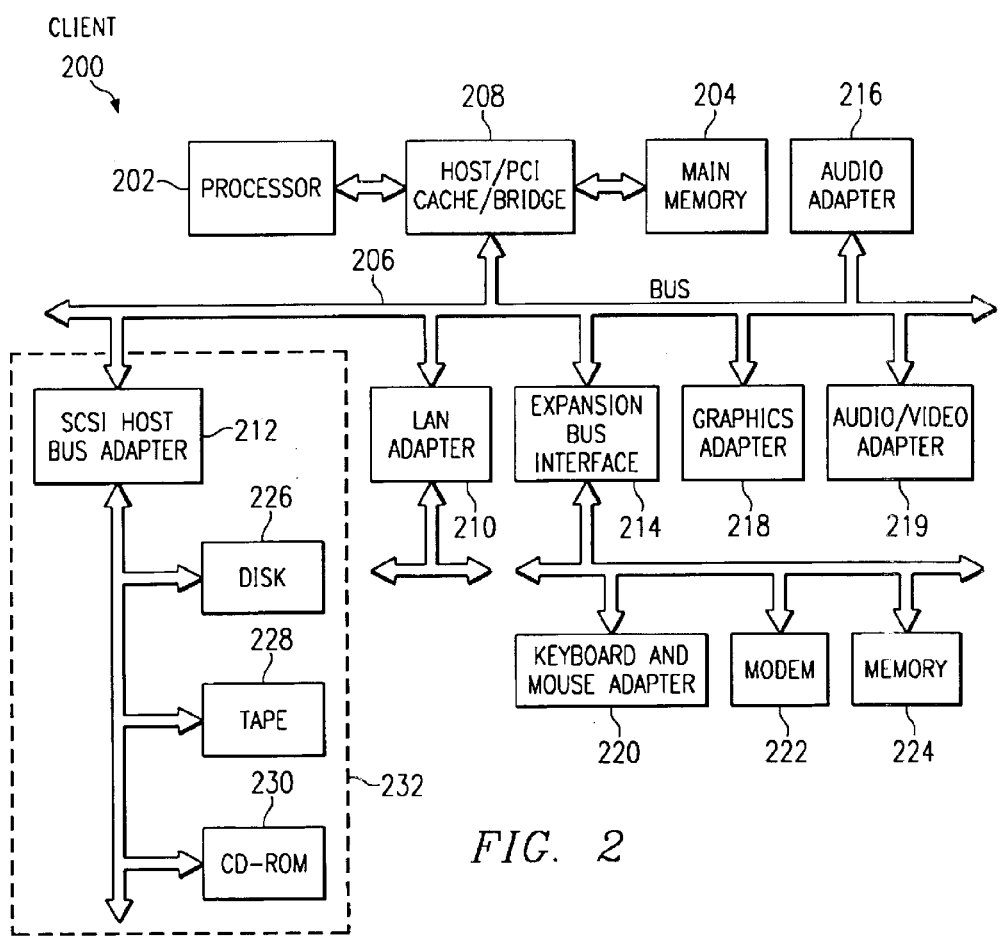
FIG. 2 is a block diagram illustrating a data processing system in which the present invention may be implemented.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host a bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent non-volatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

The present invention provides a method, apparatus, and instructions for handling call backs on system events for a collection of related threads, such as those found in a print subsystem for JavaOS for Business. The present invention includes an independent monitor thread, which is employed to watch threads executing processes, such as those used to print a document. These threads are also referred to as "worker" threads. A thread, also referred to as a Light Weight Process (LWP) is a basic unit of Central Processing Unit (CPU) utilization. A thread typically includes a program counter, a register set, and a stack space. A thread will share with its pure threads its code section, data section, and operating systems resources, such as open files and signal, collectively known as a task. Multi-threaded processes use fewer resources than multiple redundant processes. As a result, multi-threading has become more and more common. Threads operate in many respects in the same manner as processes. A thread can have one of several states including, for example, ready, blocked, running, or terminated. Threads will share a CPU and only one thread is active (running). A thread within a process executes sequentially.

The monitor thread is used to detect an infinite wait caused by an error in which the local print hardware fails, but provides no indication of the failure. For example, the print hardware may fail upon a write to the hardware.

Additionally, a monitor thread is employed to detect an unresponsive remote system during a one way communication, such as the communication that occurs during remote LPR printing.

The present invention also provides a mechanism to obtain information about the status of a thread when an exception or error occurs. Through this additional information, a mechanism is provided to cleanup system resources after an error event or job cancellation. In addition, performance information about threads may be obtained from status and other information collected during execution. Through using multiple threads the JavaOS for Business may be extend to printing to a queued multiple print job system from a single print job.

Rather than implementing events, or methods (i.e., getStatus) into different parts that the print system uses, a centralized monitor thread is used to store threads associated with each print job and gather status information. Specifically, a thread watcher monitor class is created in which a thread is used to monitor a set of threads and to handle threads with inactivity greater than a threshold and threads for which exceptions or errors have occurred. The thread watcher class will also include methods to retrieve thread status as well as methods to be called when time-outs occur. The methods to retrieve thread status include: Isdead, Isalive, Istimedout. Java defines a method in the class java.lang.Thread called isAlive. At this level, it provides no real useful information. The implementation simply checks whether the thread has been started and if it is not yet dead. It provides no intelligent tests to see that a thread is active. This method could then be extended to do intelligent tests on the question "isAlive" for this particular thread. In the depicted implementation, printers are involved and thus checks on the parallel port are made. The parallel port provides some public methods that may be used to see if the port is active. The method is TimedOut can be implemented by subtracting the start time of the thread from the current time and comparing it to the time out value set when the thread was created. This currently is not a standard to the Thread class in java. The method getTimeAlive is also not part of the Java thread class. It is implemented by subtracting the start time of the thread E from the current time. A static (always available) cleanup class name storage is provided per thread or generically that has a cleanup method that is invoked when a timeout occurs. The status information is stored in string data while the time when the thread was created is stored in integer data. Actions to be performed as a result of timeout or error, are stored in string data.

A PlatformPrintControl currently found in Java operating system creates and registers new classes PrintTrafficManager, Intelligent ThreadWatcher and PrintJobsStatusEntry.

PrintJobStatusEntry allocates string data from job information such as, for example, name, source, status, diskFileName, jobDescription setter and getter methods for each string data. The class print traffic manager (PTM) initializes active intelligent thread monitor, stores data getter and setter methods for all vector data, and allocates vector data for print job (print jobs queued cases), vector data for threads (collection of thread vector array). The print traffic manager also allocates vector data for timeout (collection of each thread's timeout), allocates vector data for startTime (collection of each threads start time), and initializes static Cleanup class (with generic cleanup method with action to call upon an error).

The Cleanup class gathers active thread information from print traffic manager, kills zombie threads (inactive, but allocated threads), recovers from error state (reset resources), and suspends/prevents unnecessary work on error (kill send thread on error). The intelligent thread monitor determines whether the thread is alive, getCurrentTime, determines whether the thread has TimedOut, obtains the Cleanup class name from print traffic manager. This thread watcher monitor class can be stored as part of another class to be used as a collection of threads that relate to a particular process. For example, a collection of threads can be used to define a print job.

Figure 3:
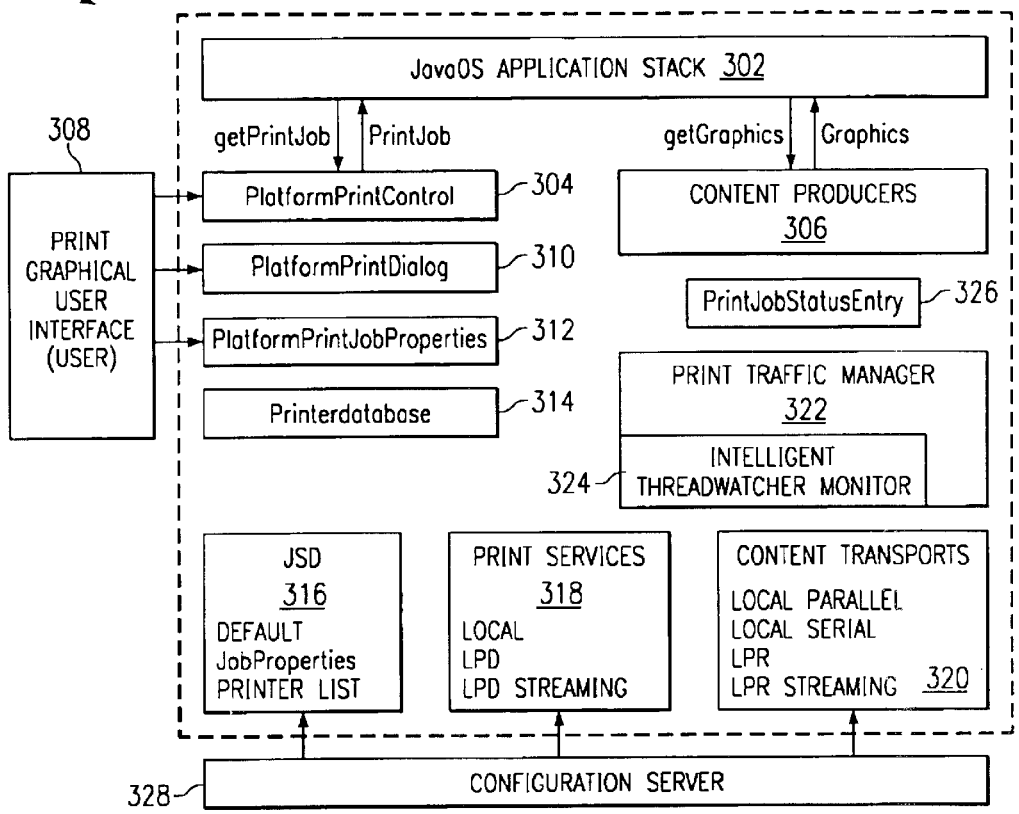
FIG. 3 is a block diagram of a printing system depicted in accordance with the preferred embodiment of the present invention.

With reference now to FIG. 3, a block diagram of a printing system is depicted in accordance with a preferred embodiment of the present invention. In the depicted examples, the processes of the present invention are implemented in a Java operating system.

Java operating system 300 contains an application stack 302 The application stack consists of a Java software application executing on JavaOS for Business to provide a desktop GUI for the operating system, an Internet browser or applet executing with a browser (e.g.HotJava, Lotus Notes, etc). Application stack 302 may send print jobs to PlatformPrintControl 304, which is a platform dependent implementation of a print control in Java that oversees the creating and execution of a print job. Application stack 302 also may send graphics data to content producers 306, which contains classes that emit their content in a print specific language, such as, but not limited to Postscript, PCL5, or PCL3.

Print graphical user interface 308 is a (GUI), which allows a user to make choices regarding location quality, and other specifics for an individual print job. A similar GUI is displayed when printing from any type of Windows system. The components depicted herein include components normally found in JavaOS for Business, which is available from Sun Microsystems, Inc. Also found within Java operating system 300 is a PlatformPrintDialog 310, which is a dialogue used to handle interaction with the user. This dialogue may receive interaction from a user through print graphical user interface 308. PlatfromPrintJob Properties 312 interacts with other objects within the printing system. Printerdatabase 314 is a class within Java operating system 300, which servers as a central registry point for print services.

JavaOS system database (JSD) 316 holds configuration and registry information for users, machines, etc. Print services 318 is an interface to print service and may be used to print to various printers attached to the client, a server, or elsewhere in a network. For example, Print services 318 may be attached to a local printer, employ Line Printer Daemon Protocol (LPD), or LPD Streaming. The Berkeley versions of the Unix(tm) operating system provide line printer spooling with a collection of programs: lpr (assign to queue), lpq (display the queue), lprm (remove from queue), and lpc (control the queue). These programs interact with an autonomous process called the line printer daemon. JavaOS for Business also provides the ability to send a print job using the lpr protocol to a remote system which has an active lpd daemon. JavaOS for Business executes a lpd daemon which has the ability to accept an incoming lpr print jobs from a remote system. In this example, Java operating system 300 also includes content transports 320 which is used for transporting content to various locations, such as a local parallel port or a local serial port. Further, content transports 320 also supports LPR and LPR Streaming. The LPR protocol requires the entire printer data to be stored in a file along with the total file size before any data can be sent to the remote LPD daemon. The LPR Streaming protocol allows for the data is "streamed" or sent in smaller data size to the remote streaming lpd queue. Streaming has the main advantages of being faster since the receiving printer can process the commands while the job is being rendered on the remote printer and the elimination of large files (color large printer resolution create very large printer data files). In accordance with the preferred embodiment of the present invention, a print traffic manager 322 is included within Java operating system 300. Print traffic manager 322 may initialize an intelligent thread watcher monitor 324. In the depicted examples, print traffic manager 322 will initialize active intelligent thread monitoring. Further, print traffic manager 322 will store data retrieved from various threads. This component will provide get and set methods for all vector data; Print job status entry 326 is where print job status information is stored during the various phases of printing. Configuration Server 328 interfaces with JSD 316, print services 318, and content transports 320 in Java operating system 300.

Print traffic manager 322, Intelligent thread watcher monitor 324 and print job status entry 326 are the new components introduced into the printing system illustrated in FIG. 3.

Figure 4:
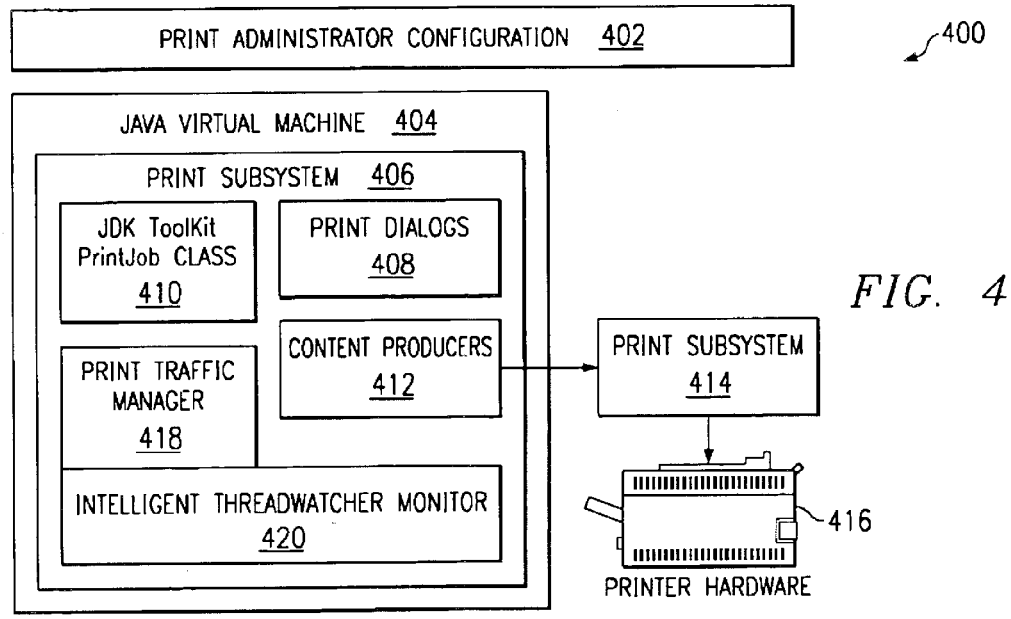
FIG. 4 is a block diagram illustrating print codes placement in a client depicted in accordance with the preferred embodiment of the present invention.

With reference now to FIG. 4, a block diagram illustrating print codes placement in a client is depicted in accordance with a preferred embodiment of the present invention. This example, client 400 includes a print administrator configuration 402, which is used to provide a user an interface to change or select various printer features. Within JVM 404, a print subsystem 406 is employed to provide printing for Java applications. Various print dialogues 408 are employed to receive input from a user through print administrator configuration 402. Printjob Class 410 provides classes to oversee a print job. This print job class is found in a JDK toolkit in the depicted example. ContentProducers 412 is used to convert from Abstract Windows Toolkit (AWT) graphics to a printer language. AWT is a toolkit containing primitives for basic windowing functionality and is contained within a JVM. These primitives include such user-interface functionality as window and dialog box manipulation, text rendering, buttons, check box, and radio button creation and manipulation, as well as graphics primitives such as line drawing, color choice, etc. Virtually all more sophisticated graphics and user-interface tools are built on top of these AWT primitives.

Content producers 412 includes various components, such as transport, PrintControl, Content Producers, Graphics, OutputStream, PrintJob, PrintService, and PrintjobStatusEntry in these examples. Content producers 412 creates printer ready data to send to Print Subsystem 414. In particular, printer ready data is sent to system (hardware) specific parts of a print subsystem for a local port or network to which the client may be attached. In this manner, print job is then sent to printer hardware 416. The sending of the printer ready data is specific to an operating system platform. The various threads that provide for printing in content producers 412 are monitored by Print Traffic Manager 418 through the use of an intelligent thread watcher monitor 420. Intelligent thread watcher monitor 420 is the new component provided in print subsystem 406.

Figure 5:
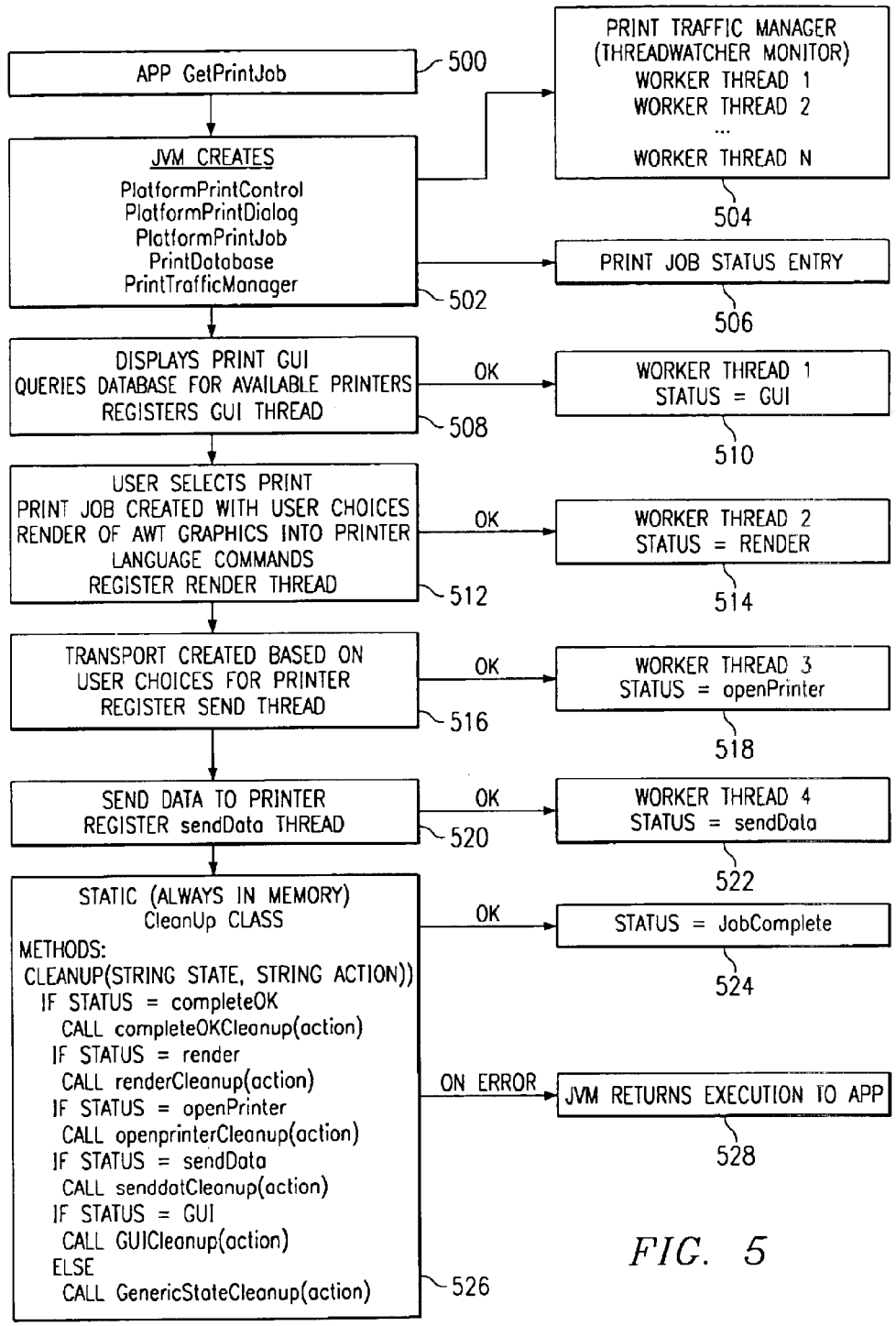
FIG. 5 is a diagram illustrating a print job flow depicted in accordance with the preferred embodiment of the present invention.

With reference now to FIG. 5, a diagram illustrating a print job flow is depicted in accordance with a preferred embodiment of the present invention. In block 500, an application uses GetPrintJob, which is a method used to initiate printing in the JVM. In response to this command, the JVM creates a PlatformPrintControl, a PlatformPrintDialog, a PlatfromPrintJob, a PrinterDatabase (if not previously created), and a print traffic manager (if not previously created). The print traffic manager is a new class, which creates a thread used to monitor the execution of other threads performing print processes in block 502. In block 504, the print traffic manager initiates a thread watcher monitor, which in this example monitors worker threads 1 through N. In FIG. 5, the thread watcher monitor monitors the different phases of the print job and records status information as the print job progresses.

In block 506, a print job status entry is created to store the status of various print jobs being processed by the worker threads. In block 508, a print GUI is displayed to user, which queries the user for available printer. In this example, worker thread 1 is registered to the GUI in the print traffic manager. This status is seen in block 510 in which the status for worker thread 1 is set equal to GUI. Entries within PrintJobStatusEntry are used to update changes in status for various threads. Potential problems during this portion of the print job include for example, no printers are installed or that the user is not allowed to print. If a problem such as that occurs and worker thread 1 becomes inactive, cleanup may be performed through thread using the status information recorded in print job status entry.

In block 512, the user has selected to print a particular document resulting in a print job being created with the user choices. A render thread is registered with the print traffic manager. Additionally, in block 512, the AWT graphics are rendered into printer language commands. In this example, the render thread is identified as worker thread 2. The status of worker thread 2 is set equal to render in block 514. Some potential problems that may occur with this portion of the print process include, for example, a problem with application code, a lack of disk space for the print job, or a read/write failure to the server when the print job is a remote print job.

Next, in block 516, transport of data occurs based on user choices for the printer. These choices, may be, for example, to a local printer or to a network printer. In this example, the send data thread is registered with the print traffic manager in block 516. Worker thread 3 is the worker thread identified with the send data thread and has it status set equal to openPrinter in block 518. This status for worker thread 3 indicates that the thread is initializing communications with the printer.

Potential problems for transport or sending data include an inability to open a port, the printer being out of paper, the printer being off-line, or the network being down if the print job is to a remote printer.

In block 520, data is sent to the printer, and the send data thread is registered with the print traffic manager as worker thread 4. Additionally, the status of this thread is set equal to send data in block 522. Potential problems with sending data to a printer include read/write errors, port time out, buffer overflow, the printer being out of paper, the network going down if the printer is a remote printer. If the print job completes, the status is set equal to job complete as shown in block 524.

In block 526, memory resources are cleaned up upon completion of the print job or upon the occurrence of an error. In this case, remaining threads are killed and the status is set equal to cleanup done. Part of the cleanup includes closing output streams, open files, memory sources, and port handles. Additionally, the status dialog is then killed.

In the depicted example, the type of cleanup that occurs in block 526 depends on the status stored for the particular thread. The following are examples of different methods used in cleanup based on the status for a thread: for status equal to completeOK, a call is made to a method completeOKCleanup; for a status equal to render, a call is made to a method rendercleanup; for a status equal to openPriner, a call is made to a method openprinterCleanup; for a status equal to sendData, a call is made to a method sendataCleanup; and for a status equal to GUI, a call is made to a method GUICleanup. In this example, if the status is not one of the ones listed above, a call is made to a method GenericStateCleanup. After cleanup occurs execution is returned to the application in block 528.

The processes occurring in block 524 occur whether the process of printing has completed or whether an error has occurred. In the case when an error occurs, the status of a particular thread is used to identify the necessary procedures to kill the thread and cleanup various resources. In FIG. 5, the print traffic manager obtained status information from various threads during the printing process. The status of the threads are stored in PrintStatusEntry 506. In the depicted examples, each thread performed a different portion of the print job. Alternatively, the same thread may perform all of the phases of the print job shown in FIG. 5.

Figure 6:
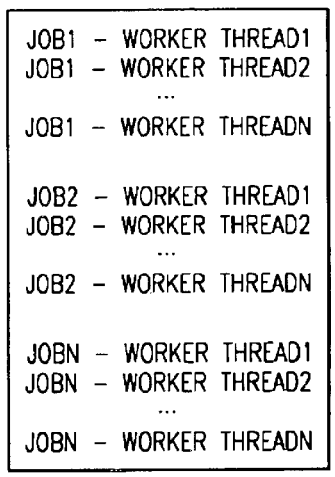
FIG. 6 is a diagram illustrating the assignment of multiple jobs depicted in accordance with the preferred embodiment of the present invention.

With reference now to FIG. 6, a diagram illustrating the assignment of multiple jobs is depicted in accordance with a preferred embodiment of the present invention. In this example, jobs 1–N are cued in a print traffic manager. Each of the print jobs is registered with a single worker threads in the set 1-N, which are the threads involved in handling the print job. Alternatively, in the instance in which each thread performs all of the tasks of the print job, each job may be assigned a different thread. In this manner, a queued multiple print job system may be provided.

Figure 7:
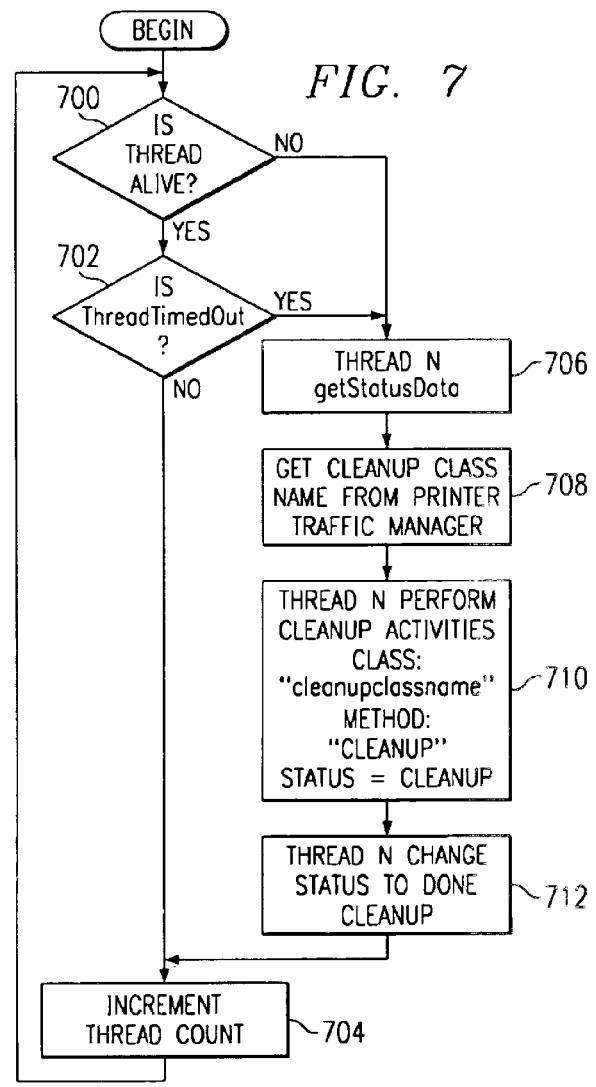
FIG. 7 is a flowchart of a process for monitoring threads depicted in accordance of the preferred embodiment of the present invention.

With reference now to FIG. 7, a flowchart of a process for monitoring threads is depicted in accordance with a preferred embodiment of the present invention. These processes are implemented in an intelligent thread watcher monitor. These processes are performed for each thread in a current pool of worker threads, such as those illustrated in FIG. 6.

The process begins by determining whether the thread is alive (step 700). If the thread is alive, then a determination is made as to whether a ThreadTimedOut has occurred (step 702). If a ThreadTimedOut has not occurred, then the thread count is incremented (step 704), with the process then returning to step 700. If the thread is not alive in step 700 or a ThreadTimedOut has occurred in step 702, then the thread status data is obtained for thread N (step 706). Thereafter, a cleanup class name is obtained from the printer traffic manager (step 708).

Next, cleanup activities are performed for thread N based on the cleanup class name obtained from the printer traffic manager (step 710). These cleanup activities are performed based on the status of the thread. Depending on the status of the thread, a method for cleaning up is called. Examples of methods that may be called are illustrated in block 526 in FIG. 5. Thereafter, the status of thread N is changed to done cleanup (step 710) with the process then returning to step 704.

Java defines a method in the class java.lang.Thread called isAlive. At this level it provides no real useful information. The implementation simply checks whether the thread has been started and if it is not yet dead. It provides no intelligent tests to see that a thread is active. This method could be extended to do intelligent tests on the question "isAlive" for this particular thread. In the depicted example, printers are involved and the parallel port is checked. The parallel port provides some public methods that may be used to see if the port is active.

The method is TimedOut can be implemented by subtracting the start time of the thread from the current time and comparing it to the timeout value set when the thread was created. This currently is not a standard to the Thread class in java. The method getTimeAlive is also not part of the Java thread class. It is implemented by subtracting the start time of the thread from the current time.

In order for cleanup to be run correctly, the cleanup thread must know the state of the worker thread. In order to get this information, the cleanup thread uses the PrintJobStatusEntry, which has been continuously updated as the print job has progresses. Based on the status of the worker thread, the cleanup thread will take the appropriate clean up action.

Cleanup activities vary depending on this state. If the worker thread was in the render state, then the clean up thread will be responsible for cleaning up memory and making sure the control returns to the user application. If the worker thread was in the process of sending data to the printer, then the cleanup thread will do the above plus reset the printer. The reset is performed to ensure that the printer has been reset to a state where it can again receive print jobs. Finally, the worker thread must be removed from the pool of watched threads.

Once cleanup is complete, the monitor thread will remove the print job and all associate worker threads from the print job traffic manager. This is done using standard java thread methods. Finally the worker thread will exit indicating to the JVM that it is finished.

Figure 8:
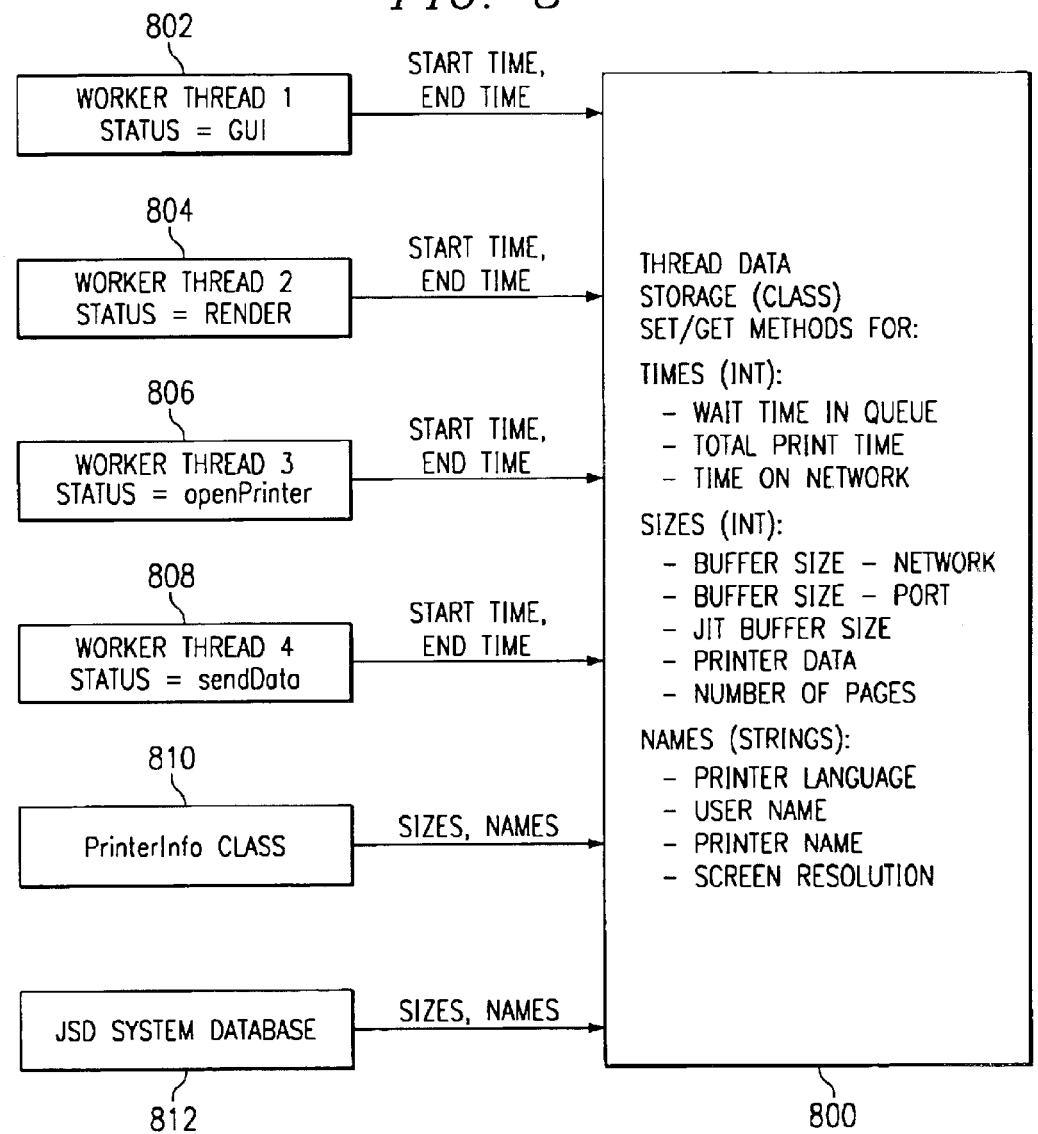
FIG. 8 is a block diagram illustrating storage of status information depicted in accordance with a preferred embodiment of the present invention.

With reference now to FIG. 8, a block diagram illustrating storage of status information is depicted in accordance with a preferred embodiment of the present invention. In this example, a thread data storage 800 stores status information for various threads. Thread data storage 800 is part of a class that includes set and get methods for storing and obtaining information, such as, times, sizes, and names. Times and sizes are integer data while names are string data. In this example, worker thread 1 has a status set equal to GUI in block 802. Start time and end time for this status is sent to thread data storage 800. In block 804, worker thread 2 has a status set equal to render. The start and end time for this particular status is sent to thread data storage 800. Worker thread 3 in block 806 has a status of openPrinter in which start and end times for this particular status are sent to thread data storage 800. Start and end times for the status sendData for worker thread 4 in block 808 are sent to thread data storage 800. In block 810, printerInfo class sends size and name data regarding the print job to thread data storage 800. JSD system database also provides performance such as buffer sizes or printer name data to thread data storage 800.

Figure 9:
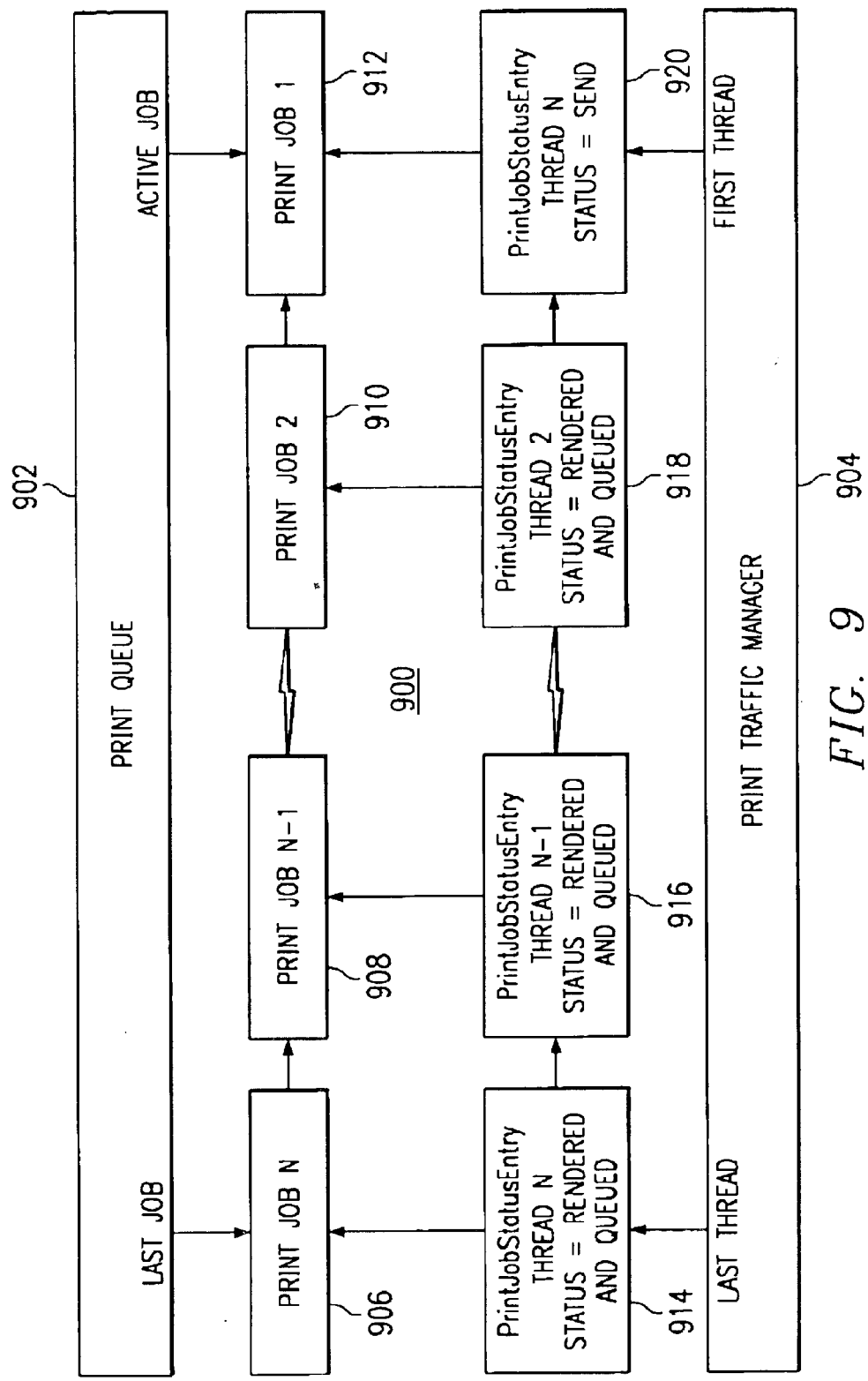
FIG. 9 is a block diagram illustrating a multiple print job system depicted in accordance with a preferred embodiment of the present invention.

With reference now to FIG. 9, a block diagram illustrating a multiple print job system is depicted in accordance with a preferred embodiment of the present invention. In this example, print system 900 may be implemented with the monitoring and event handling system of the present invention. Print system 900 includes a print queue 902 and a print traffic manager 904. Other components may be present in print system 900, but are not shown to avoid obscuring the invention. In this example, print jobs 906–912 are present in print system 900. Print job status entries 914–920 are associated with print jobs 906–912, respectively. Print job status entries 914, 916, and 918 indicate that the print jobs for the threads have been rendered and queued. Print job status entry 920 indicates that the thread is sending a print job.

In this example, print job 906 is last print job while print job 912 is the active print job. Print job 906 is handled by the last thread in print traffic manager 904 while print job 912 is handled by the first thread in print traffic manager 904.

Figure 10:
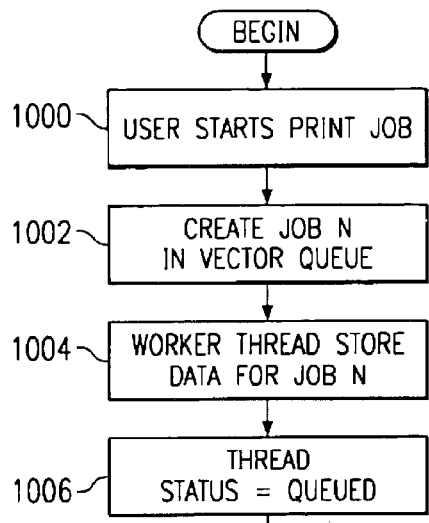
FIG. 10 is a flowchart for queuing multiple print jobs depicted in accordance with a preferred embodiment of the present invention.

With reference now to FIG. 10, a flowchart for queuing multiple print jobs is depicted in accordance with a preferred embodiment of the present invention. The process in FIG. 10 may be implemented in print system 900 in FIG. 9 to queue multiple print jobs.

The process begins by a user starting a print job (step 1000). A print job N is created in a vector queue for the print job (step 1002). Thereafter, a worker thread stores data for job N (step 1004). This data includes information about the local spooler, the print job status entry, the content producer, and the transport associated with the job. Data stored includes job name, print job destination, printer language, resolution, start time, timeout value, user name, etc. Thereafter, the thread status is set equal to queued (step 1006) with the process terminating thereafter.

Figure 11:
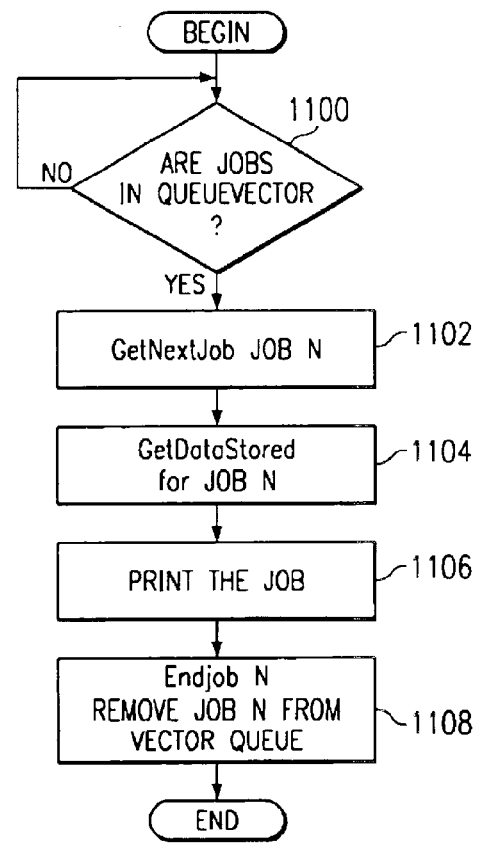
FIG. 11 is a flowchart de-queuing a print job depicted in accordance with a preferred embodiment of the present invention.

With reference now to FIG. 11, a flowchart de-queuing a print job is depicted in accordance with a preferred embodiment of the present invention. The processes in FIG. 11 may be implemented in print system 900 in FIG. 9 to de-queue or remove print jobs.

The process begins by determining whether any jobs are stored in the queue vector (step 1100). If no jobs are present in the queue vector, the process returns to step 1100. If jobs are present in the queue vector, the next job, job N, is obtained (step 1102). The process then obtains the data stored for job N (step 1104). This data obtained includes the local spooler, the print job status entry, the content producer, and the transport. Thereafter, the job is printed (step 1106). The steps involved in printing the jobs include those illustrated in blocks 516 and 520 in FIG. 5.

Afterwards, job N is ended and removed from the vector queue (step 1108) with the process then returning to step 1100 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples illustrate the handling of print jobs, the processes of the present invention may be applied to other functions. For example, the processes may be applied to handling display of graphics or retreival of documents. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for monitoring a plurality of related threads, the method comprising the data processing system implemented steps of:

polling the plurality of related threads for status information;

responsive to receiving the status information, determining whether a thread within a plurality of related threads is inactive; and responsive to an occurrence of inactivity in a thread within the plurality of related threads in which the inactivity is due to an event, initiating cleanup processes based on the status information, wherein the event is at least one of an occurrence of a period of time or an error.

2. The method of claim 1 further comprising:

responsive to receiving the status information, storing the status information.

3. The method of claim 1, wherein the polling, determining, and initiating steps are performed by a single thread.

4. The method of claim 3, wherein the single thread is part of a class.

5. The method of claim 1, wherein the initiating stop comprises:

identifying active threads within the plurality of related threads;

identifying inactive threads within the plurality of related threads; and terminating inactive threads.

6. The method of claim 1, wherein the plurality of related threads is a plurality of printer threads.

7. The method of claim 1, wherein the plurality of related threads is a plurality of video threads.

8. The method of claim 1, wherein the method is implemented in a virtual machine.

9. The method of claim 8, wherein the virtual machine is a Java virtual machine.

10. A data processing system for monitoring a plurality of related threads, the data processing system comprising:

polling means for polling the plurality of related threads for status information;

determining means, responsive to receiving the status information for determining whether a thread within a plurality of related threads is inactive; and initiating means, responsive to an occurrence of inactivity in a thread within the plurality of related threads in which the inactivity is due to an event, for initiating cleanup processes based on the status information, wherein the event is at least one of an occurrence of a period of time or an error.

11. The data processing system of claim 10 further comprising:

storing means, responsive to receiving the status information, for storing the status information.

12. The data processing system of claim 10, wherein the polling, determining, and initiating means are preformed by a single thread.

13. The data processing system of claim 12, wherein the single thread is part of a class.

14. The date processing system of claim 10, wherein the initiating means comprises:

first identifying means for identifying active threads within the plurality of related threads;

second identifying means for identifying inactive threads within the plurality of related threads; and terminating means for terminating inactive threads.

15. The data processing system of claim 10, wherein the plurality of related threads is a plurality of printer threads.

16. The data processing system of claim 10, wherein the plurality of related threads is a plurality of video threads.

17. The data processing system of claim 10, wherein the data processing system is implemented in a virtual machine.

18. The data processing system of claim 17, wherein the virtual machine is a Java virtual machine.

19. A computer program product in a computer readable medium for monitoring a plurality of related threads, the computer program product comprising:

first instructions for polling the plurality of related threads for status information;

second instructions, responsive to receiving the status information, for determining whether a thread within a plurality of related threads is inactive; and third instructions, responsive to an occurrence of inactivity in a thread within the plurality of related threads in which the inactivity is due to an event, for initiating cleanup processes based on the status information, wherein the event is at least one of an occurrence of a period of time or an error.

20. The computer program product of claim 19 further comprising:

fourth instructions, responsive to receiving the status information, for storing the status information.

21. The computer program product of claim 19, wherein the polling, determining, and initiating instructions are performed by a single thread.

22. The computer program product of claim 21, wherein the single thread is part of a class.

23. The computer program product of claim 19, wherein the initiating instructions comprise:

first instructions for identifying active threads within the plurality of related threads;

second instructions for identifying inactive threads within the plurality of related threads; and third instructions for terminating inactive threads.

24. The computer program product of claim 19, wherein the plurality of related threads is a plurality of printer threads.

25. The computer program product of claim 19, wherein the plurality of related threads is a plurality of video threads.

26. The computer program product of claim 19, wherein the computer program product is implemented in a virtual machine.

27. The computer program product of claim 26, wherein the virtual machine is a Java virtual machine.

* * * * *

UNITED STATES PATENT AND TRADEMARK OFFICE
CERTIFICATE OF CORRECTION

PATENT NO. : 6,842,898 B1
APPLICATION NO. : 09/329456
DATED : January 11, 2005
INVENTOR(S) : Carlson et al.

Page 1 of 1

It is certified that error appears in the above-identified patent and that said Letters Patent is hereby corrected as shown below:

Col. 10, line 1: after "method" delete "is TimedOut" and insert --isTimedOut--.

Col. 12, line 20: after "initiation" delete "stop" and insert --step--.

Col. 12, line 57: before "processing" delete "date" and insert --data--.

Signed and Sealed this

First Day of August, 2006

JON W. DUDAS
*Director of the United States Patent and Trademark Office*